(12) United States Patent
Burns

(10) Patent No.: US 9,535,985 B2
(45) Date of Patent: Jan. 3, 2017

(54) DUAL PURPOSE AUDIO PLAYER IN CASSETTE HOUSING WITH BUILT-IN DISPLAY AND CONTROLS

(71) Applicant: Dronk, LLC, Dallas, TX (US)

(72) Inventor: Stephen Burns, Dallas, TX (US)

(*) Notice: Subject to any disclaimer, the term of this patent is extended or adjusted under 35 U.S.C. 154(b) by 426 days.

(21) Appl. No.: 14/020,410

(22) Filed: Sep. 6, 2013

(65) Prior Publication Data

US 2015/0073573 A1 Mar. 12, 2015

(51) Int. Cl.
*G06F 17/00* (2006.01)
*G06F 17/30* (2006.01)

(52) U.S. Cl.
CPC .................. *G06F 17/3074* (2013.01)

(58) Field of Classification Search
CPC ............ H04L 12/2812; H04L 2012/2849; H04L 29/06027; H04L 65/4076; H04L 65/4084; H04L 67/00; H04L 12/1818; H04L 12/66; H04L 2012/285; H04L 12/282; H04L 63/102; H04L 65/1069; H04R 1/1041; H04R 3/00; H04R 5/04; H04N 21/47214; H04N 21/4722; H04N 21/6582; H04N 5/765; H04N 21/25891; H04N 21/4126; H04N 21/42202; H04N 21/42203; H04N 21/4394; H04N 21/4398; H04N 21/84
USPC ....... 381/86, 119, 74; 700/94; 455/344, 186; 369/2, 1, 7–11
See application file for complete search history.

(56) References Cited

U.S. PATENT DOCUMENTS

| | | | | |
|---|---|---|---|---|
| 6,061,306 A | * | 5/2000 | Buchheim | G11B 23/049 369/11 |
| 6,502,194 B1 | * | 12/2002 | Berman | G06Q 30/0601 370/231 |
| 6,882,492 B1 | * | 4/2005 | Lee | G11B 23/049 360/62 |
| 2002/0002039 A1 | * | 1/2002 | Qureshey | G06F 17/30749 455/344 |
| 2006/0093163 A1 | * | 5/2006 | Herbert | H04H 60/04 381/119 |
| 2013/0114823 A1 | * | 5/2013 | Kari | H04R 1/1041 381/74 |

* cited by examiner

*Primary Examiner* — Lun-See Lao
(74) *Attorney, Agent, or Firm* — Law Office of Sam Sokhansanj PLLC

(57) ABSTRACT

A fully functioning dual purpose digital audio player presented in cassette-shaped housing which incorporates a display, control buttons, audio output, and remote control.

17 Claims, 6 Drawing Sheets

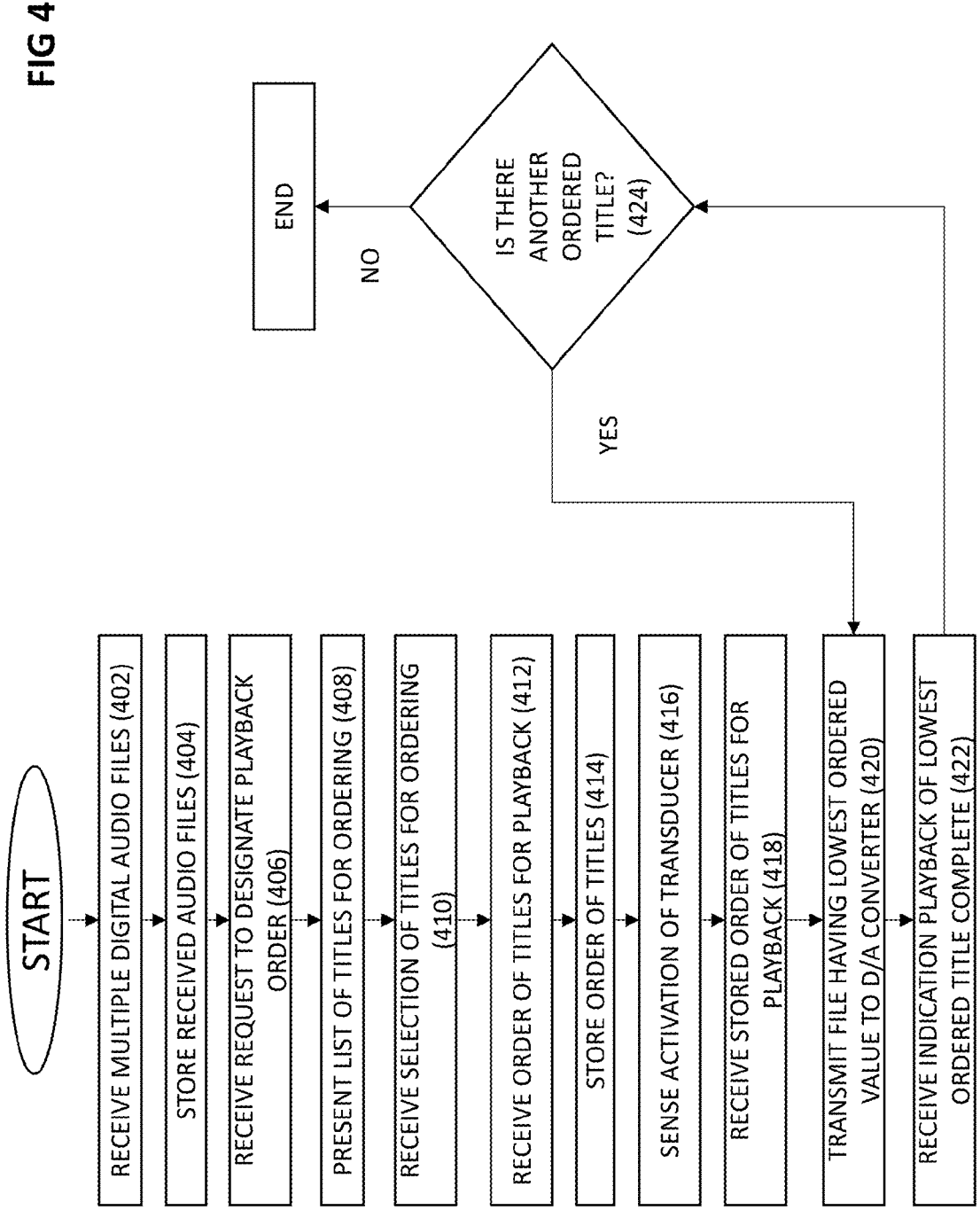

DUAL PURPOSE AUDIO PLAYER IN CASSETTE HOUSING WITH BUILT-IN DISPLAY AND CONTROLS

FIELD OF THE DISCLOSURE

The invention relates to a rechargeable device capable of playing audio files using built-in controls and a display panel that provides audio output through an audio port or a cassette player. Audio files are stored on the device using a memory card.

BACKGROUND

Throughout the 1980's, the compact cassette was one of the most commonly used formats of prerecorded media for buying and transporting music. By the early 1990's, the music industry started to move away from the cassette format in favor of newer technologies. Compact discs (CDs) followed by MP3s became the industry standards. However, the cassette remains a popular icon for generations of music lovers.

The ability to transport the music of choice has long been a key desire of consumers. Although, a traditional cassette player is not necessarily standard equipment in new vehicles at present, many pre-owned vehicles in service and on the market are equipped with cassette players. Similarly, while portable or home audio equipment newly available through retail outlets are rarely equipped with a cassette player, there are many pre-existing units available in homes and businesses as well as in the resale market.

Today, consumers obtain and play audio data, whether it be music, book readings and the like, through digital processing equipment. Today's consumer, rather than purchasing a cassette tape bearing a favorite artist's recordings, purchases rights to download an instance of an artist's audio work. This process may be achieved through a personal computer, hand held device, smart phone, or similar device accessing a website available via the Internet that allows a consumer to download digitally stored audio files to be stored on such a device. These devices often serve not only as the repository for the audio file but also as the playback function. Personal computers are equipped with a sound card and speakers to permit perceptible playback of the audio files. Hand held devices, such as tablets, smart phones, portable MP3 players and the like include similar functionality. Alternatively, these devices may interface with more sophisticated stereo equipment to produce a more refined sound. Various hand held devices are able to receive compressed data files for storage and later playback by the same device. These devices include application programs, typically provided by the device manufacturer or otherwise downloadable from the audio file retailer that permits storage and playback of the audio file. Examples of such devices are smart phones and portable MP3 audio players. Use of headphones, ear buds or connection to speakers and/or stereo equipment enables the user to hear the recordings.

The ability to connect devices wirelessly is known in the art, as are standard systems and protocols that permit a plurality of wirelessly enabled devices situated within a local area network ("LAN") to communicate. Bluetooth is a wireless protocol that has facilitated replacing connections via cables between various devices. The Ethernet IEEE 802.11 standard, known to those skilled in the art, enables a wireless extension of the Internet using the TCP/IP protocol standard. WiFi connections allowing users to access the Internet are enabled by this IEEE protocol. Additional wireless connectivity standards are known in the art and are expected to be developed due to demand.

One of the most appealing features of the cassette was the art of making a mixed tape (commonly known as a "mixtape"). A mixtape is a collection of music from different sources that has been hand-picked, and often (but not always) built around a theme. The mixtape provided a fun, creative, and personalized way to share music with those you cared about. The problem with modern digital audio file downloading, storing and retrieval systems is that they lack the nostalgic element that came with creating the homemade mixtape. While a user of modern equipment may certainly download works of various artists along a common theme, the ceremony of giving the created mixtape to another is lost as the modern equipment available on which digital music files are stored is too expensive to provide as a token of one's affection. Thus, there is a need in the art for a portable and compact device that incorporates the capability to download, store and playback digital audio files and serves as a standalone audio device that also operates as a classic cassette player, that is at the same time inexpensive enough to provide as a novelty gift.

SUMMARY OF THE EMBODIMENTS

The disclosed embodiments combine the newer technology of today with the nostalgia of the 1980's by allowing audio files to be loaded in the cassette-shaped audio player using a standard memory card. Using a data cable and a computer, songs stored on the memory card can be arranged in the order the user specifies thus creating a "mixtape". The user can play and listen to the songs using the audio player in combination with stereo headphones or other audio speakers. The device will also play the songs using a cassette player.

It is an object of the present disclosure to provide a fully functioning standalone audio player encased in cassette-shaped housing.

It is another object of the present disclosure to provide a dual purpose audio player encased in a cassette-shaped housing that operates as a standalone device and within a cassette player.

It is another object of the present disclosure to provide a standard memory card slot which allows storage for audio files.

It is another object of the present disclosure to provide an onboard display which shows artist and song information about the audio files.

It is a further object of the present disclosure to provide onboard controls including (but not limited to) On/Off, Volume Up/Down, Rewind, Fast Forward, Previous, Next, Play, and Pause.

It is a further object of the present disclosure to provide user capability to designate and store a playback order of stored audio files.

It is a further object of the present disclosure to provide a dual purpose audio player that communicates with associated digital data devices via a wireless network.

Other objects, advantages and features of this invention will be more apparent hereinafter.

The invention accomplishing the above enumerated objects is the audio player, which can play audio files through stereo headphones, audio speakers, or a cassette player. The audio player can be used with a data cable and a computer to allow the user to load and arrange audio files on the memory card.

The embodiments disclosed herein refer to an audio player that is a portable digital audio device that can function as a cassette able to produce audio signals through a traditional cassette player.

Audio devices can play analog and digital recordings. An analog recording entails recording sound that is in the form of an analog waveform. Digital recordings, on the other hand, entail sampling an audio waveform and assigning a binary value to each sample to arrive at a digital representation of the waveform. An electro-mechanical transducer is needed to make digital or analog recordings audible. Typically, speakers, earphones, ear buds or headphones include a transducer and internal amplification equipment to produce audible signals.

Modern audio players include devices such as MP3 players. Such devices typically employ integrated circuits (IC), which enable the device to contain advanced processing capability. A storage medium associated with the IC allows for receipt, storage and retrieval and playback of digital audio files. ICs employed in such devices also facilitate compression of data for more efficient use of limited storage space. Thus, MP3 players, and other digital audio players, enable downloading, storage and subsequent playback of compressed digital audio information received through the Internet.

The above summary in not intended to describe each and every disclosed embodiment or every implementation of the disclosure. The Description that follows more particularly exemplifies the various illustrative embodiments.

BRIEF DESCRIPTION OF THE DRAWINGS

The embodiments herein are described, by way of example only, with reference to the accompanying drawings, wherein:

FIG. 4 depicts a flow diagram of the steps performed by the presently disclosed dual purpose audio device in response to a user request to play a digital audio file.

DETAILED DESCRIPTION OF THE EMBODIMENTS

The embodiments described herein are of a dual purpose portable audio device. In one mode of operation, the device operates as a standalone, portable digital audio player in which control, functionality and playability of the player is self-contained. In another mode of operation, the device allows playback of audio files stored locally on the device through a conventional analog cassette player. In addition to the two modes of functionality, the device is outwardly a replica of a traditional reel to reel cassette player, which allows offering the device as a gift to convey a collection of audio data files.

The principles and operation of dual purpose portable audio device may be understood with reference to the drawings and accompanying descriptions.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields which would be of significant utility.

Phrases and terms similar to "software", "application", "algorithm", and "firmware" may include any non-transitory computer readable medium storing thereon a program, which when executed by a computer, causes the computer to perform a method of function.

Phrases and terms similar to "network" may include one or more data links that enable the transport of electronic data between computer systems and/or modules. When information is transferred or provided over a network or another communications connection (either hardwired, wireless, or a combination of hardwired and wireless) to a computer, the computer uses that connection as a computer-readable medium. Thus, by way of example, and not limitation, computer-readable media can also compromise a network or data links which can be used to carry or store desired program code in the form of computer-executable instructions or data structures and which can be accessed by a general purpose or special purpose computer.

Figure 1A:
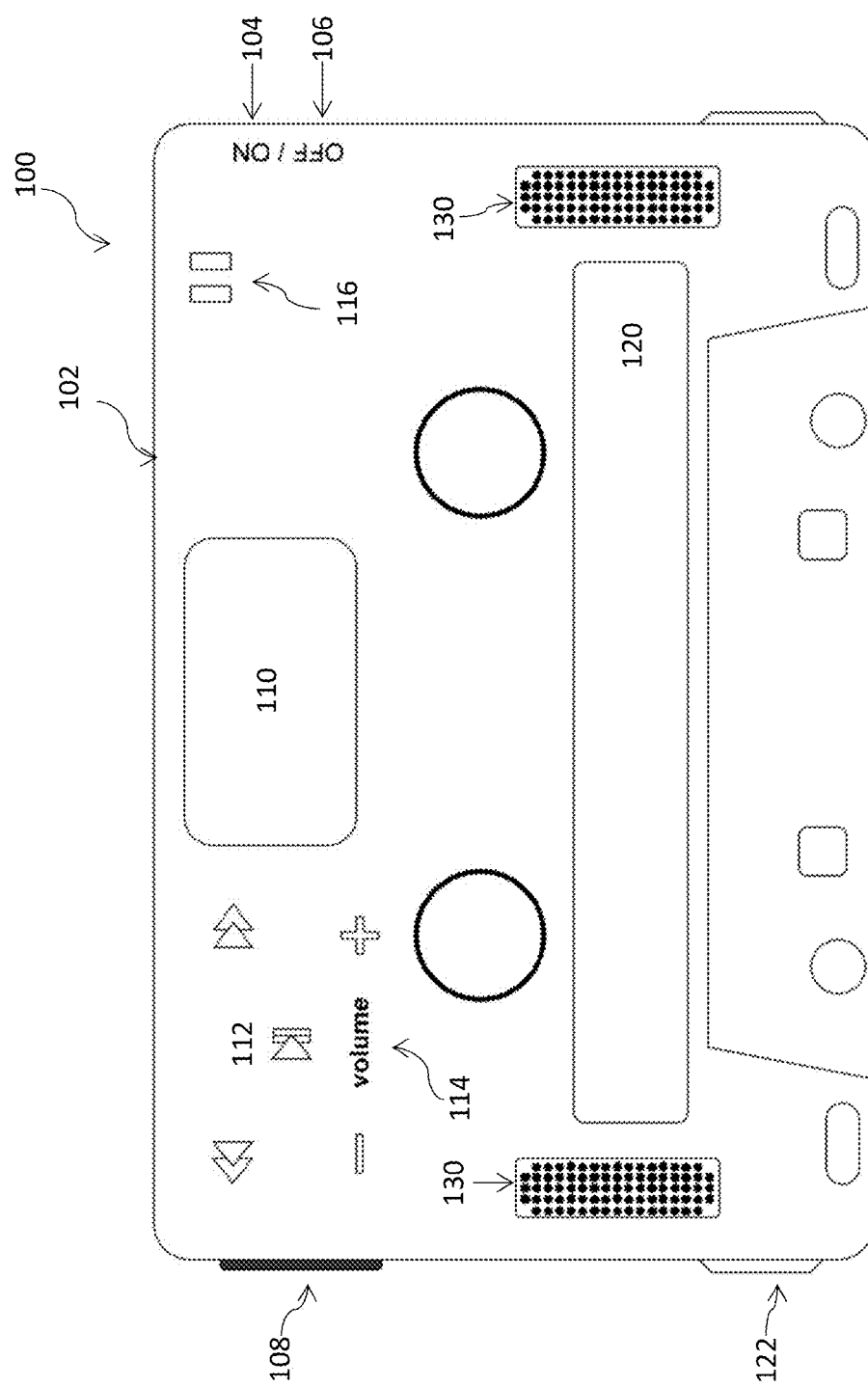
FIGS. 1A, 1B, 1C, 1D and 1E depict multiple views of the dual purpose portable audio device according to one of the exemplary embodiments of the present disclosure.
Figure 1C:
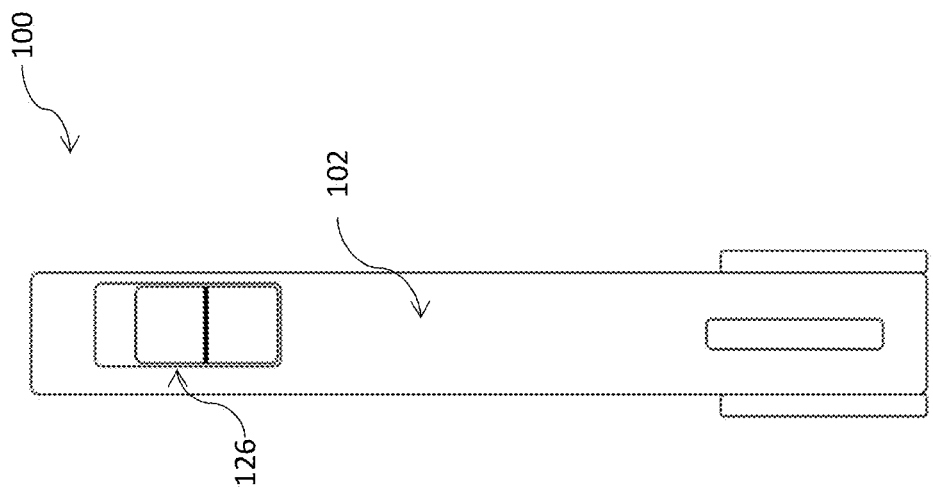

FIG. 1A depicts a front view an embodiment of the disclosed mixtape. In FIG. 1A, mixtape 100 is shown. As seen, mixtape 100 includes a body section 102 that is shaped and formed as a traditional cassette tape. Mixtape 100 includes various internal and external components that will be discussed in turn. Mixtape 100 is of a size and shape that will fit into a basic cassette player, such as those commonly installed in vehicles or in home or portable stereo equipment. The external portion of body section 102 includes many components and houses various functionality. On the front side of body section 102 of mixtape 100 resides markings for an on 104 and off 106 position of power switch 126, with power switch 126 depicted in the right side view of an embodiment of mixtape 100 in FIG. 1C. In one embodiment, body section 102 includes a power switch 126 resident on the side face of the body section 102 of mixtape 100. The power switch 126 is coupled to a power supply residing within body section 102.

Continuing with FIG. 1A, a display 110 is shown that allows display of various information associated with the data file being downloaded, stored or replayed by the mixtape 100, such as the name and recording artist of a musical piece. Display 110 may also be enabled through appropriate processing capability and programming instructions to display time, date or other information of interest to the user. Display 110, in one embodiment, may be a light emitting diode (LED) display or a liquid crystal display (LCD) or other known displays.

Figure 1B:
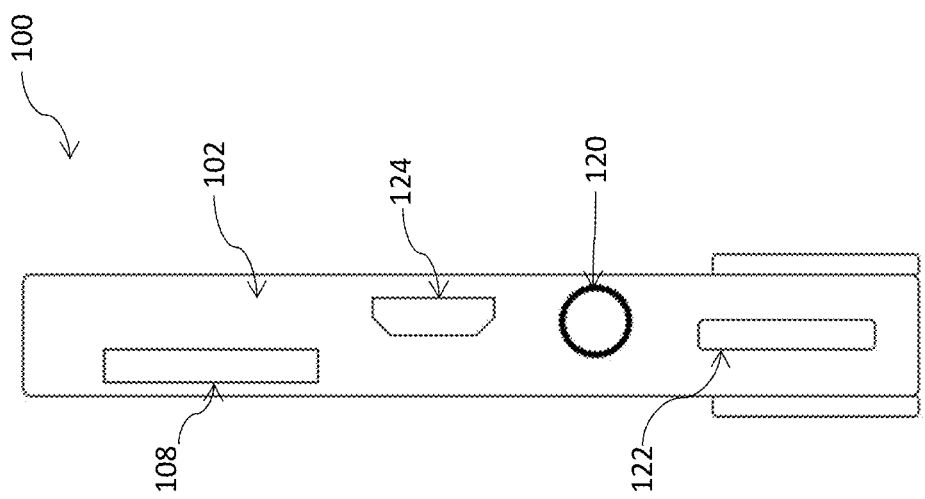
Figure 1D:
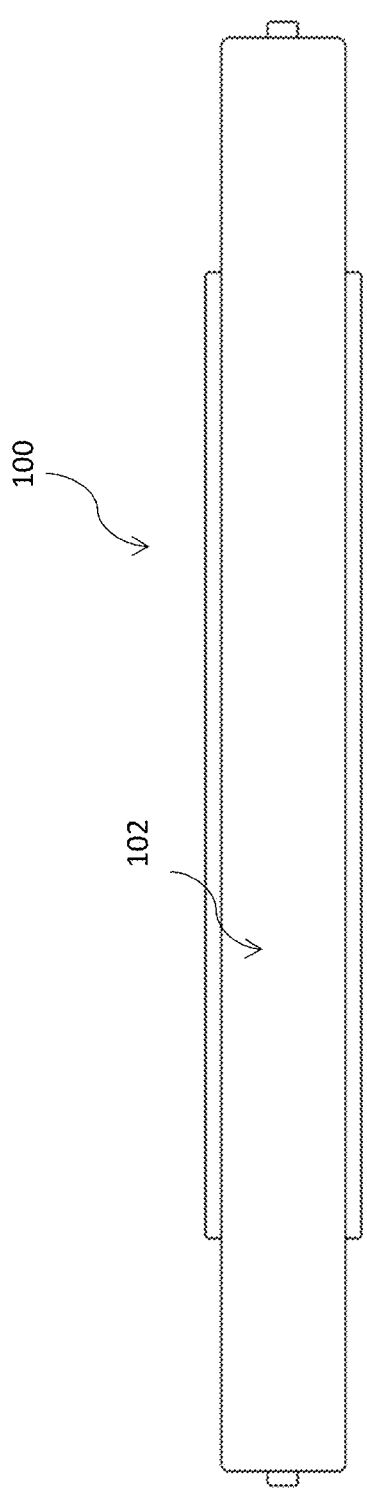

On the outer surface of body section 102 of mixtape 100 reside audio playback controls 112. Playback controls 112 include typical forward and rewind controls, as well as a track forwarding control, play, pause and stop controls, as shown. The exterior of mixtape 100 body section 102 also includes volume controls 114 to increase or decrease the level of sound produced by mixtape 100, whether through headphones or an external speaker or self-contained speakers 130. FIG. 1B depicts a left side view of an embodiment of mixtape 100.

Referring to FIG. 1B, which provides a left side view of an embodiment of mixtape 100, resident on the body section 102 is a memory card slot 108. Memory card slot 108 is of a size and shape to receive a digital data storage device as is well known in the art. In FIG. 1B, one embodiment of mixtape 100 includes an infrared port 122 for enabling wireless communication between various devices, such as a laptop computer, smart phone, tablet or the like and the mixtape 100. FIG. 1B also depicts an audio port 120 through which the aforementioned external speakers or headphones may be detachably connected. Wireless communication occurs in accordance with the wireless protocols previously described or other suitable protocol.

On the left face of body section 102, shown in FIG. 1B, is also situated a data and charging port 124. Data and charging port 124 is sized to accommodate common data storage device and charging cables such as known micro-USB cables and USB cables.

Figure 1E:
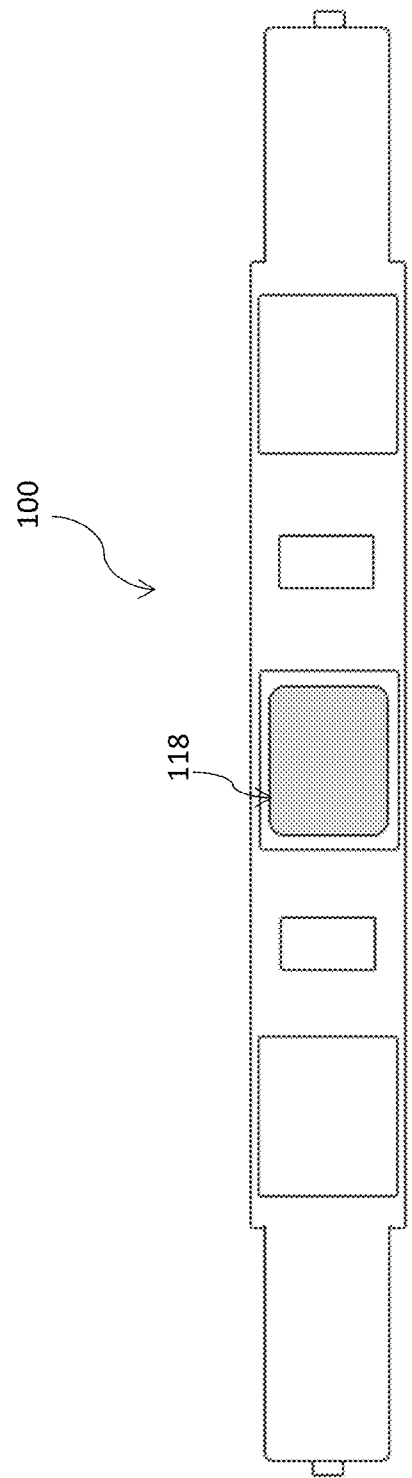

Referring again to FIG. 1A, the front face of body section 102 also includes charging indicator 116, which may be an LED. Charging indicator 116 may be equipped to provide one indication when the mixtape's charge is low and another indication when the mixtape is being charged. On the bottom face of the mixtape 100, shown in one embodiment in FIG. 1E, is magnetic head 118. Magnetic head 118 is a transducer that upon insertion of mixtape 100 in a cassette player, aligns with a head on a cassette player when mixtape 100 is inserted in a cassette player.

Figure 2:
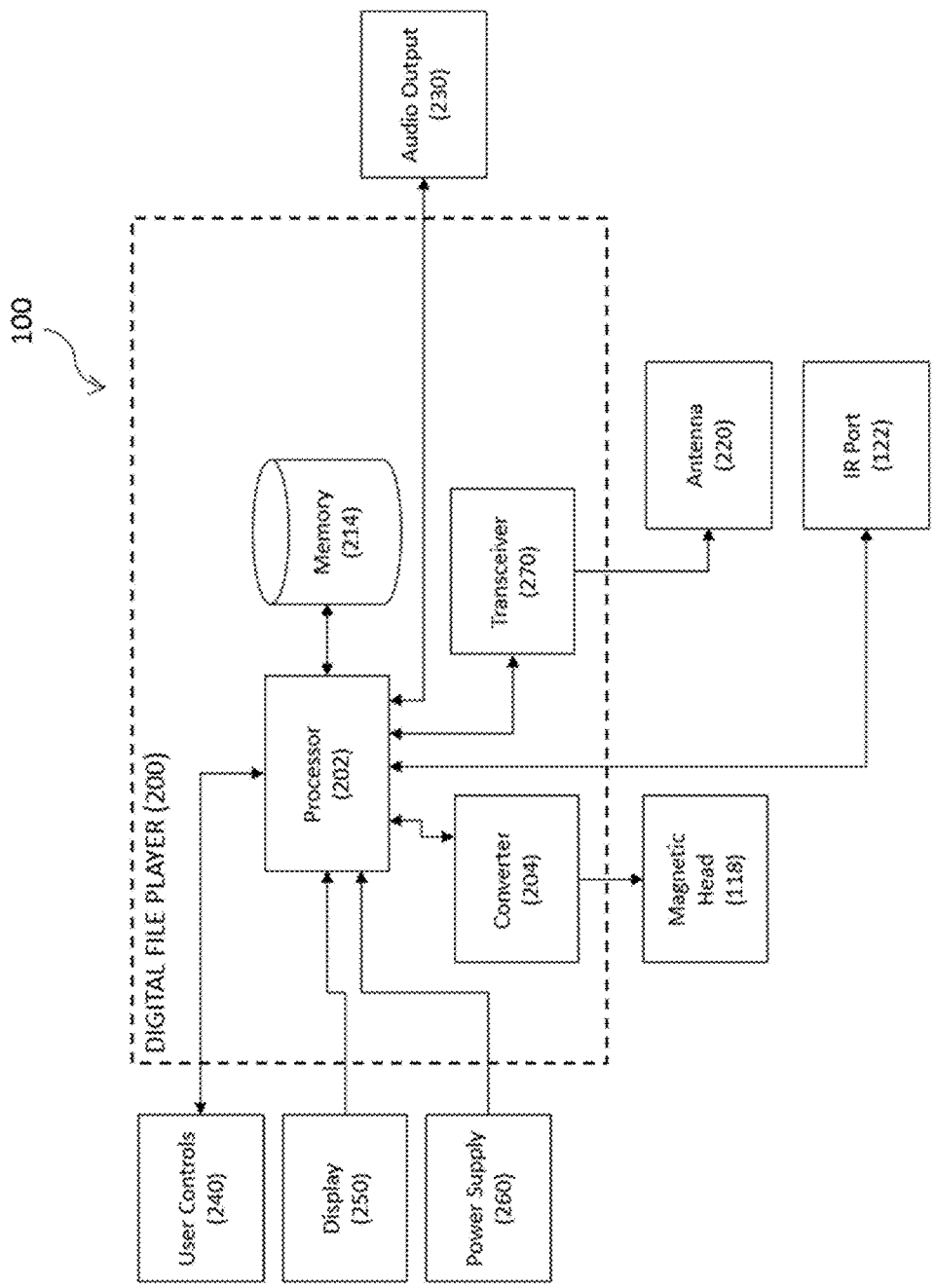
FIG. 2 depicts a functional block diagram of an exemplary embodiment of the presently disclosed dual purpose portable audio device.

The internal components of mixtape 100 are described and depicted with reference to FIG. 2. In FIG. 2, mixtape 100 includes a digital file player (DFP) 200, comprised of various components and software. DFP 200 includes a processor 202, that controls much of the functionality of mixtape 100. DFP 200 also includes analog to digital and digital to analog converters 204 that provide conversion capability of audio signals. Processor 202 is coupled to external mixtape user control features described above with reference to FIG. 1, such as volume controls, playback controls and the display. Processor 202 also causes information to be displayed on display 250. The information provided on display 250 includes the title or source of a digital file, the time, the date and the time remaining for playback of the digital file. Processor 202 also provides the wireless communication protocol capability to the mixtape to allow wireless receipt of digital data files and wireless transmission of audio signals.

Coupled to processor 202 of DFP 200 is local memory 214. Digital music files are transmitted to mixtape 100 through a wired connection through data port 124 or infrared port 122 or antenna 220 in accordance with through known wired or wireless data transmission protocols. Digital music files sent to mixtape 100 are received by the digital file player 200 and stored in local memory 214 under the control of processor 202. Processor 202 provides encoding and decoding of compressed data formats such as the MP3, WAV, AIFF, M4A, Vorbis, OCG, AAC, Windows Media Audio (WMA), and/or ATRC format. Local memory 214 may be any type of storage medium including RAM, ROM or flash memory. Processor 202 and local memory 214 may be integrated into a single IC. Software executed by processor 202 to carry out the functionality of mixtape 100 may also reside in local memory 214 or may be embedded software. Processor 202 and local memory 214 enable storing and play back of digital audio files through one or more speakers that may be integrated or external to mixtape 100, or earphones, such an external speaker or earphone set are coupled to mixtape 100 via audio port 120 or transmitted wirelessly via Bluetooth®.

Functionalities of mixtape 100 may be implemented in software or hardware or a combination of both. When features are implemented in software, this software may be installed by the manufacturer or by users. Application software may be implemented using embedded software running on embedded processors or it may run on a specific operating system. Some or all or combinations of applications and feature sets may also be implemented in hardware or in silicon. Some functionality or feature sets may be implemented in special chip sets and may include one or more or combinations of, for example, application-specific integrated circuits (ASICs), field programmable gate arrays (FPGAs), digital signal processors (DSPs), systems on a chip, firmwares, etc.

In one embodiment, an application program stored in association with processor 202 includes instructions that enable a user to selectively order digital audio files within local memory 214. In operation, a user, through display 110, may view a list of audio files downloaded to mixtape 100. In one embodiment, through activation of a control button located on body section 102, the user may highlight an indication of the audio file and place that file in a particular order for playback in relation to other audio files stored in memory 214 of mixtape 100. For example, if a particular arrangement of songs has a particular meaning to a user or the recipient of the mixtape, then the user may wish to arrange the titles in that order. Rather than leaving it to the recipient of the mixtape to determine the appropriate order of the music, the user can pre-designate the arrangement after downloading of the titles to the local memory 214 has occurred. The processor 202, under the direction of the application program residing in local memory 214, executes the instructions associated with the user's selections.

Digital music files stored in this manner may be played using the mixtape in its capacity as a digital file player. In this manner, a user may affect playback of a particular audio title through the playback controls interface 114 provided on the body section 102 of the mixtape. The controller 202 and the playback controls 114 are electrically connected and processor 202 responds to instructions made by the user via the playback controls 114 to play back audio files stored in memory 214 of digital file player 204. The user may listen to the audio via the mixtape's internal speaker or through a wireless Bluetooth enabled earphone or speakers or wired earphones connected to the mixtape via audio port 120.

Mixtape 100 also includes a converter 204 coupled to DFP 200 under the control of processor 202. If a user wishes to use the mixtape in traditional cassette mode, the user may insert the mixtape in a cassette player. Those skilled in the art will appreciate how operation of a traditional cassette player occurs in terms of the reel to reel operation of the cassette within the player. In the mixtape, however, an encoded magnetic tape is not employed in the traditional manner. Instead, as discussed, in one embodiment, on a front face of the body section 102 of the mixtape resides a magnetic head 118 that is a transducer for affecting playback through a cassette player of the digital audio file stored on the mixtape. The digital audio file selected for playback is decoded under the control of processor 202 and the resultant digital audio signal is converted by converter 204 to an analog signal. The analog signal is then delivered to the magnetic head 118 transducer that includes induction coils that convert the analog signal to electromagnetic signals that are read by the playing head of the cassette player. The cassette player play head is aligned to magnetic head 118 upon insertion of mixtape 100 into the cassette player, and ultimately delivered to speakers coupled to the cassette player or earphones in order for the signal to be audible to the user.

According to one embodiment, mixtape 100 includes a power supply 260, which may be a battery, detachably installed in body section 102. This battery may be recharged by connection at charging port 124 a suitable charging cable that is commercially available.

As used herein, the term "cassette player" includes but is not limited to home and portable stereo devices having a cassette deck for accepting a cassette including a rollable magnetic audio tape and playing the audio information contained therein. A cassette player usable with the present invention can form a part of a hand held cassette player, such as a Walkman and the like.

The term "cassette deck" refers to an opening of a cassette player in which a mixtape 100 is inserted. The opening of the cassette player is situated such that upon activation, the magnetic head 118 and play head of the cassette player are aligned.

According to one embodiment of the present disclosure, mixtape 100 includes an infrared port 122 (shown in FIG. 1B) that allows communication between mixtape 100 and a remote device from which digital audio files may be retrieved and stored in local memory 224. Such remote devices include, but are not limited to, desk top computers, laptop computers, smartphones, cellular phones, tablets, personal digital assistants (PDAs), or other processing equipment capable of retrieving digital data files stored locally at or within the device or that may be retrieved through a remote network such as the Internet. Transmission of digital files through the infrared port 122 requires transmission of the data through a wireless protocol as discussed above. Similarly, digital files may be transmitted between mixtape 100 and the previously discussed remove devices via a cable, such as a USB cable connected to mixtape 100 at data transfer port 124.

In another embodiment, mixtape 100 provides a memory card slot 108 for insertion of a removable storage device. This device, in one embodiment, is flash memory or a memory stick. This removable device may serve as the only rewritable storage device for mixtape 100 or may supplement local storage 224.

The mixtape cassette accommodates digital audio files transmitted across a wired or a wireless network for playback through a tape head in a cassette tape player. The mixtape cassette includes a body carcass that may be inserted into the cassette deck. DFP 200 of mixtape 100 includes a transceiver 270 that provides conversion of base band audio signals for radio frequency communications within the wireless network. Transceiver 270 is under the control of processor 202 that facilitates conversion of digital audio signals to base band signals and conversion of base band signals from the digital audio signals. Processor 202 also facilitates conversion of the digital audio signals to analog audio signals.

Continuing with FIG. 2, processor 202 within mixtape 100 also acts as a wireless module that supports a wireless user interface between mixtape 100 and associated devices. Processor 202 controls transceiver 270 for converting base band signals for radio frequency communications. Processor 202 and transceiver 270 converts digital audio signals to base band signals and base band signals to digital audio signals to facilitate wireless communications. Processor 202 and converter 204 convert digital audio signals to analog audio signals.

Figure 3:
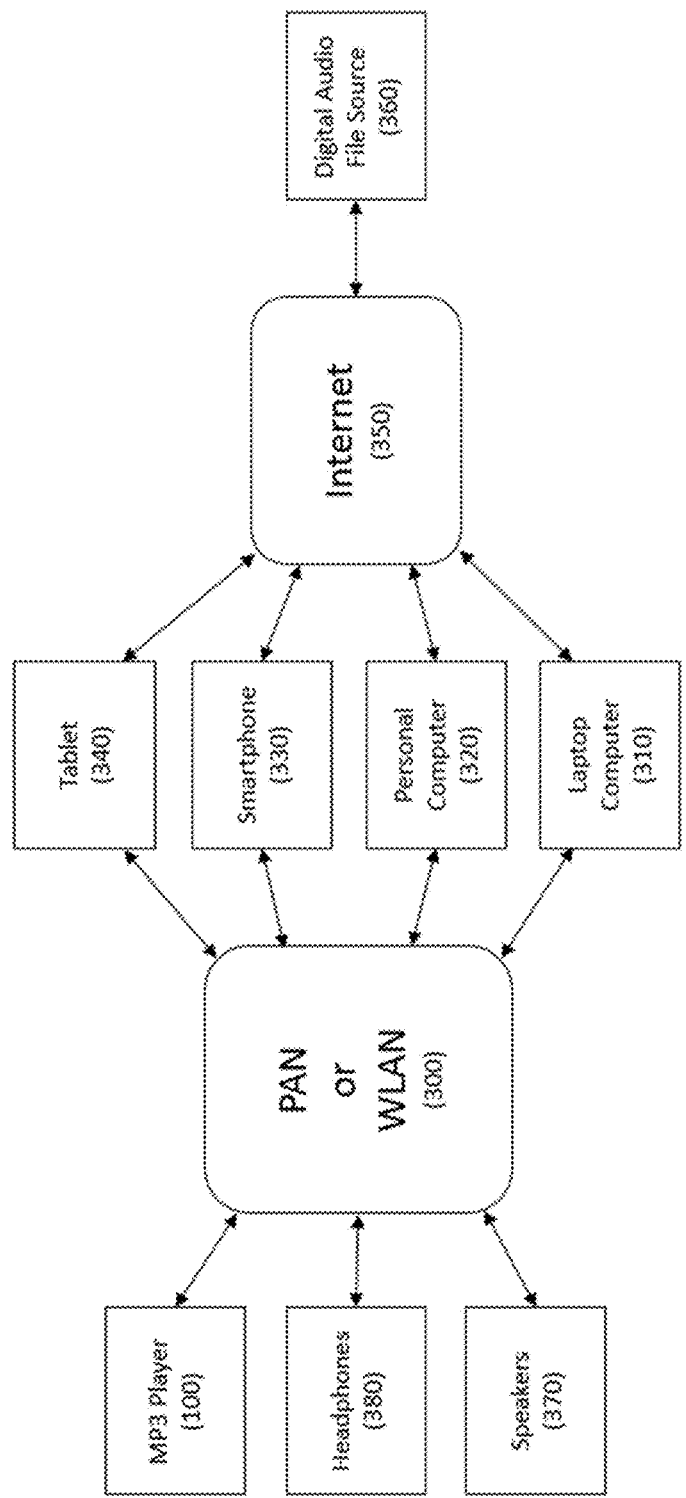
FIG. 3 depicts a network diagram in which the presently disclosed dual purpose portable audio device is a component.

FIG. 3 depicts a typical network architecture of mixtape 100 and associated devices that communicate with mixtape 100 to provide mixtape 100 with digital audio files. Mixtape 100 communicates with associated devices including a laptop computer 310, personal computer 320, smartphone 330 or tablet 340 through, for example, a Bluetooth enabled personal area network (PAN) or WiFi Local Area Network (WLAN) 300. The previously mentioned devices and the mixtape 100 may communicate in accordance with the Bluetooth protocol once such devices are so enabled. Similarly, these devices may communicate via a WLAN once devices are adapted and configured to communicate via an appropriate wireless protocol. These devices may retrieve digital audio files from digital audio file source 360 over a remote or distributed network such as the Internet 350. These retrieved digital audio files, are in turn, transmitted to mixtape 100 via an adapted network, depending on how the delivering devices are enabled.

Mixtape accessories such as headphones 370 and speakers 380 may be coupled to mixtape 100 via the WLAN 300 or may be connected via known cabling options, such as USB cables. In one embodiment, RF signals are transmitted through a WLAN between the mixtape and the other local devices. The user can therefore reproduce WLAN 12 audio content from any of the aforementioned WLAN compliant devices through the cassette tape player 4.

The mixtape is formed for use in a cassette player and to provide the size, look and features of a traditional cassette tape.

Referring again to FIG. 2, the magnetic head 118 of mixtape 100 provides an interface to the play head of a cassette player. Mixtape 100 also includes an antenna 220 that facilitates wireless transmission of signals to mixtape 100 through associated appropriately enabled devices. These signals include the audio data and WLAN protocol data. Radio frequency transceiver 270 is coupled to antenna 220. The transceiver modulates and demodulates base band WLAN signals received through the antenna 220. Processor 202 combines digital audio signals and converts them into base band signals or converts the base band signals to digital audio signals. This provides the protocol layering process for the WLAN protocol.

Operation of mixtape 100 may be understood through reference to FIG. 4, which is a process flow diagram according to an illustrative embodiment of the present invention. The steps provided in the process flow diagram of FIG. 4 are performed through user interaction with mixtape 100, which in turn prompts the processor of mixtape 10 to execute software residing in local storage (ROM) or embedded within the processor.

The process illustrated in FIG. 4 includes the steps performed by the processor 202 of mixtape 100 when a user designates a particular order for playback of multiple digital audio files. Recall that a feature of the present disclosure is to provide a digital audio player that may perform as a traditional cassette. Even if several hundred titles are stored on mixtape 100, all of those titles need not be designated for playback via cassette player in a designated order. A user may select less than all titles for ordered playback.

The process of playing back an ordered list of titles via cassette player is described in the flowchart of FIG. 4. The process begins at step 402 with the processor 202 of mixtape 100 receiving for storage multiple titles of digital audio files. In one embodiment, mixtape 100 receives digital audio files from various sources via wired or wireless connectivity. It is assumed here that mixtape 100 received various digital audio files from a laptop computer over a WLAN. Once processor 202 recognizes receipt of the digital audio files, at step 404, processor 202 affects storage of the audio files in an associated storage device. Next, at step 406 the processor receives a request from the user to designate an order of select titles for playback. This request may be made through a menu feature that is invoked by selection of a combination of various control activators previously discussed. Once a request is received by processor 202, processor 202 causes a list of titles that are available for ordering to be displayed to the user via display 110. In the event of an extensive list, alternatively the processor may invoke instructions to display a search window within display 110. Through this search window, a user may serially search for audio files by title, artist, date of download or other criteria. Selections for ordering may be made serially, that is, a user may perform multiple searches and compile a smaller universe of titles for ordering based on the search results.

Once a listing of titles is presented to the user in one of these forms, the user selects the titles that will be included in the ordering and the processor receives this selection at step 410. Next, the user is presented via display 110 with a narrowed list of titles and the user creates an ordered list that represents the order in which the selected titles are to be played back. The user is able to provide an order for playback via the display 110. This may be done by the user by highlighting a selection then activating a "save" command as a first choice and repeating the process for subsequent titles. Display 110 acts as a user interface in this regard with previously discussed function keys serving as command keys in this process. Alternative selection means may be employed using known user interface techniques. Once the user completes the process or ranking or ordering the selected titles for playback, the process continues with step 412 where the processor 202 receives the complete order of selected titles for playback. Upon receipt of this list, the processor in one embodiment, will add header data to the selected files reflecting that the audio file has been designated as one for ordering and where it had been placed for playback among the selected files for ordering. For each ordered audio file, a value is assigned to the title reflecting a place in the order. For the title to be played first, a lowest value n is assigned, for the next title to be played, a value of n+1 is assigned, as so forth, until all selected titles are assigned value. At step 414, the process causes the storing of the order and this additional header and value information in local memory.

The list of ordered audio files for playback remains stored. At step 416, once the mixtape 100 is inserted into a cassette deck, the processor is informed that cassette playback mode of operation is active and the processor searches for any stored ordering of titles for playback. If an ordering has been saved, the processor retrieves the order at step 418. At step 420, the digital audio file bearing the lowest is transmitted to the digital to analog converter residing within mixtape 100. Once the digital file is converted to analog, it is received by the transducer residing in the magnetic head 118 of mixtape 100, resulting in the play head of the cassette player sensing the electromagnetic signal created by the inductive coils of the transducer. The electronics of the cassette then play the audio file in audible form. Once the playback of the lowest valued title is complete, the processor is so informed at step 422. The processor then queries the assigned values of the remaining titles to determine if there are valued titles remaining, the lowest valued title is selected for playback and the process returns to step 420 for playback of the next ordered title. The digital to analog conversion and subsequent playback of the several titles continues until the processor at step 424 determines that no other ordered titles remain. At that point, ordered playback operation in accordance with one embodiment of the present disclosure ends.

At the completion of this process, the user may repeat the ordered playback of the digital audio files. Alternatively, the user may de-activate ordered playback via selection of command keys on body portion 102 of mixtape 100. Once de-activated, the mixtape may play all stored audio files in order of storage or in a random order based on user selection. Alternatively, the user may activate a new re-ordering of various titles to "re-customize" mixtape 100 to provide a different ordering of the same or different titles, depending on the user's preference. Through the systems, devices and processes disclosed herein, the user advantageously enjoys the benefits of a traditional cassette tape while having the ability to dynamically create customized cassette tapes from a single device.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

I claim:

1. A dual purpose audio device comprising:
   a body section formed as a cassette;
   a digital audio file player component internal to said body section, the digital audio file player component including a memory and a processor configured to download, store and play a digital audio file through at least one audio sensing device;
   a transducer in the body section for providing analog audio information readable by a magnetic playing head of an analog cassette player for playing the digital audio file through the cassette player;
   a display associated with the processor configured to display information related to the digital audio file; and
   a non-transitory computer readable medium containing program instructions for designating an order of playback of a plurality of digital audio files, wherein execution of the program instruction by the processor causes the processor to carry out the steps of:
   (a) presenting a list of the plurality of digital audio files;
   (b) receiving a response identifying a first digital audio file;
   (c) designating the identified first digital audio file as one that will be played among the plurality of digital audio files;
   (d) receiving a response identifying a second digital audio file;
   (e) designating the identified second digital audio file as one that will be played among the plurality of digital audio files;
   (f) establishing an order for playback between the designated first digital audio file and the designated second digital audio file; and
   (g) automatically begin playback of the first digital audio file and the second digital audio file based on the established order of playback upon detecting the cassette being initiated for playback within the analog cassette player.

2. The dual purpose audio device of claim 1, wherein the at least one audio sensing device is a speaker internal to the body section.

3. The dual purpose audio device of claim 1, wherein the at least one audio sensing device is a speaker externally connectable to the dual purpose audio device through a port formed in the body section.

4. The dual purpose audio device of claim 1, wherein the speaker is externally connectable to the dual purpose audio device through an infrared port formed in the body section.

5. The dual purpose audio device of claim 1, wherein the at least one audio sensing device is at least one earpiece insertably attached to a user's ear.

6. The dual purpose audio device of claim 5, wherein the at least one earpiece is enabled to receive audio signals over a personal area network using short wave radio transmissions in the ISM frequency band.

7. The dual purpose audio device of claim 1, wherein said digital audio information is transmitted to the audio device from an external source through a wireless network.

8. The dual purpose audio device of claim 1, further comprising user control activators situated on an external side of the body section, wherein the user control activators cause control of least one of the digital audio file player's functions.

9. The dual purpose audio device of claim 8, wherein the user control activators are selected from the group consisting of play, stop, pause, reverse, forward, repeat, and volume control.

10. The dual purpose audio device of claim 7, wherein the external source is one of a group consisting of a personal computer, a laptop computer, a smart phone, or a computerized tablet.

11. The dual purpose audio device of claim 1, further comprising a digital to analog converter that converts digital audio signals after a play head of a cassette player is actuated by insertion of the body section into a corresponding opening of the cassette player.

12. The dual purpose audio device of claim 1, further comprising a rechargeable power source.

13. The dual purpose audio device of claim 1, further comprising a memory card that is detachably insertably connected to the body portion.

14. The dual purpose audio device of claim 1, further comprising a display associated with the processor on which information relating to a state of the audio device is presented to the user.

15. A dual purpose audio device comprising:
a body section formed as a cassette;
a digital audio file player component internal to said body section, the digital audio file player component including a memory and a processor configured to download, store and play a digital audio file through at least one audio sensing device;
a transducer in the body section for transmitting analog audio information readable by a magnetic playing head of an analog cassette player for playing the digital audio file through the cassette player;
a display associated with the processor configured to present information related to the digital audio file; and
a non-transitory computer readable medium containing program instructions for designating an order of playback of a plurality of digital audio files, wherein execution of the program instruction by the processor causes the processor to carry out the steps of:
receiving a response identifying a first digital audio file;
designating a first order of playback for the identified first digital audio file as one that will be played among the plurality of digital audio files;
receiving a response identifying a second digital audio file; and
designating a second order of playback for the identified second digital audio file as one that will be played among the plurality of digital audio files; and
automatically begin playback of the first digital audio file and the second digital audio file based on the established order of playback upon detecting the digital audio file player of the cassette being initiated for playback within the cassette player.

16. The dual purpose audio device of claim 15, further comprising wherein the first and second order of playback are each assigned a value based on priority.

17. A dual purpose audio device playback method, comprising:
receiving a response identifying a first digital audio file among a plurality digital audio files on a digital audio file player shaped as a cassette tape, wherein the digital audio file player includes a transducer for transmitting analog audio information readable by a magnetic playing head of an analog cassette tape player for playing the digital audio files through the analog cassette tape player;
receiving a designation for a first order of playback for the identified first digital audio file as one that will be played among the plurality of digital audio files;
receiving a response identifying a second digital audio file; and
designating a second order of playback for the identified second digital audio file as one that will be played among the plurality of digital audio files; and
automatically beginning playback of the first digital audio file and the second digital audio file based on the established order of playback upon detecting the digital audio file player being initiated for playback within an analog cassette tape player.

* * * * *